July 14, 1936.  D. SAMIRAN  2,047,229
FLUID SEGREGATING APPARATUS
Filed Aug. 24, 1932
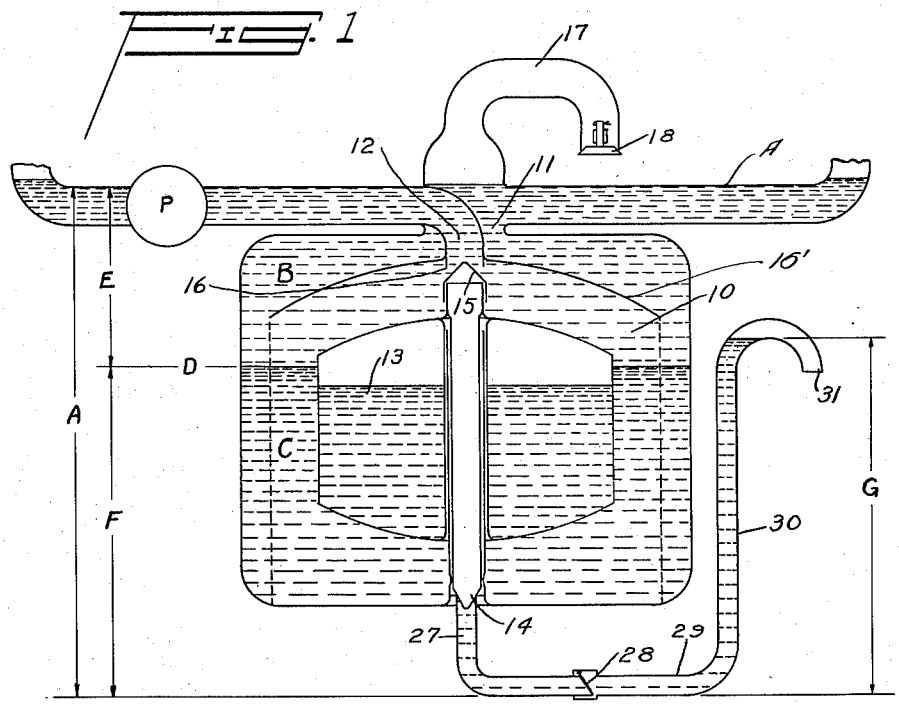
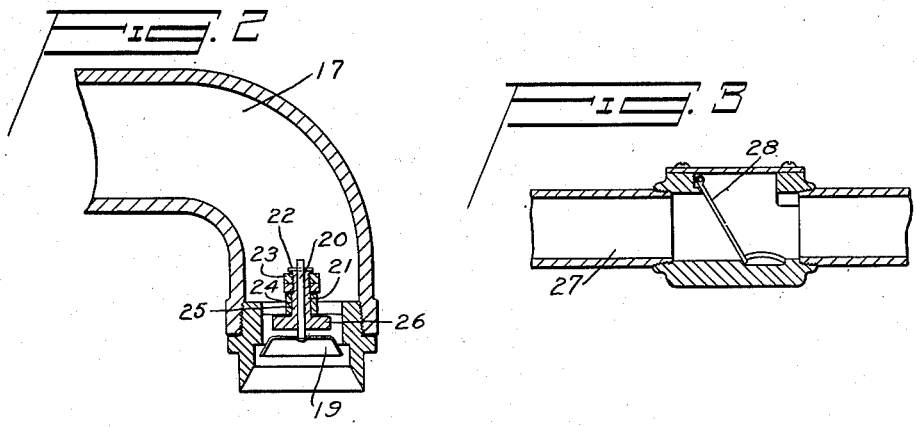
INVENTOR
DAVID SAMIRAN.
ATTORNEYS Patented July 14, 1936

2,047,229

UNITED STATES PATENT OFFICE 2,047,229

FLUID SEGREGATING APPARATUS

David Samiran, Dayton, Ohio

Application August 24, 1932, Serial No. 630,237

4 Claims. (Cl. 210—54)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to apparatus for the automatic isolation of fluids and more particularly to apparatus having float means responsive to fluids having densities greater or less than a fluid of given density.

Reference is made to my copending application Serial No. 448,391, filed April 29, 1930, and to my copending reissue application Serial No. 414,759, filed December 17, 1929, in which I have described a novel method and means for obtaining an adjustment of a float to a predetermined specific gravity or density by adjusting the same within a liquid of the same or a known specific gravity or density.

In segregating apparatus of the type set forth in my above identified apparatus a pump either mechanically or electrically operated is generally employed for pumping fluid into the segregating apparatus and through the system and it will be readily apparent that while the pump is in operation, the segregator must be maintained air-tight, otherwise the suction pressure created by the pump would not force any liquid into the segregator. To this end the inlet passage to the float chamber, or the float chamber itself is provided with a suction valve that is suction operated to atmospherically seal the float chamber, while the pump is in operation.

In fluid segregators of the type set forth in my above identified pending applications, a lower discharge passage is provided for drawing off the heavier component from the float chamber. This discharge passage is under the control of a needle valve which is carried by the float. Under normal conditions the level of the heavier component is such that the float is at a position of rest with the needle valve maintained against its seat. When the level of the heavier compound rises, however, the float in responding to the rise in level, moves upwardly, raising the needle valve from its seat to thereby permit the heavier component to discharge. Since the float chamber is completely filled with liquid when operating, and a suction pressure is built up by the pump, the head of liquid in the float chamber is trapped by reason of the air-tight condition of the float chamber and under these conditions the discharge of the heavier component from the float chamber is not readily effected. As the float is displaced upwardly, the upper needle valve provided on the float closes the outlet passage of the float chamber and the suction created by the pump becomes ineffective in so far as the float chamber is concerned at which time the suction pressure on the suction valve is relieved and the valve is gravity actuated to permit an inrush of air into the float chamber. Under these conditions, the discharge of the heavier component will be readily effected.

An object of the present invention is to provide in connection with apparatus of this character, a discharge tube for the discharge outlet of the float chamber having a shape such that a desired head of the heavier component will be normally trapped therein, which head of liquid shall correspond substantially to a head of the heavier component in the float chamber required to obtain the normal position of the float when the lighter component is not contained therein. By arranging the discharge tube in this manner and in the event of leakage of the heavier liquid past the lower needle valve, the head of the overlying lighter component may be utilized to effect an automatic segregation of the liquids in the float chamber until the combined heads of the lighter and heavier components in the float chambers substantially equal the head of the heavier component that is normally trapped in the discharge tube. When this condition exists, the flow of the heavier component from the float chamber automatically ceases.

A further object of the present invention is to provide a discharge tube of this character with a check valve so that the head of the heavier component trapped therein will maintain a constant pressure against the check valve to keep the same normally seated and prevent the suction pressure created by the pump when operating from sucking air into the float chamber through the discharge tube.

With these and other objects in view, the invention consists in the construction, arrangement and combination of parts, all of which will be first fully described and afterwards pointed out in the appended claims.

Referring to the accompanying drawing:

Fig. 1 is a diagrammatic view of a preferred embodiment of a fluid segregating system incorporating my invention;

Fig. 2 is an enlarged detailed view of the suction valve shown in Fig. 1; and

Fig. 3 is an enlarged detailed view of the check valve arrangement which is provided in connection with the discharge tube.

In illustrating a preferred embodiment, my invention is shown in connection with a gasoline fluid dispensing system in which the suction feed of the fluid from the source of supply may be accomplished (either manually or by power means as shown in Fig. 1). The system comprises a source of supply of gasoline, that may be located, as is the general custom, in an underground tank, (not shown) a fluid segregator having an inlet passage connected with the tank and adapted to segregate fluids of heavier specific gravity from a fluid of higher specific gravity and a suction pump in the outlet passage thereof, the segregator being interposed between the source of supply, preferably adjacent thereto, and the suction pump and being adapted to receive the fluid to segregate the undesirable components prior to its being pumped through the outlet passage.

In the power actuated suction feed illustrated in Fig. 1 and described herein a combination valve means and electric means are utilized, the valve means cooperating with the suction device to create a vacuum whereby a flow of fluid through the segregator mechanism may be established and to destroy the vacuum when a predetermined quantity of undesirable component or components, such as water in the dispensing of the gasoline, has accumulated, to permit the automatic segregation thereof. It is to be understood, however, that the invention is not limited to suction actuated valve means for the establishment of the fluid flow through the segregator inasmuch as the valve means for atmospherically sealing the segregator may be electrically actuated.

The improved segregator illustrated in the present invention, which embodies the principles disclosed in my pending applications hereinbefore mentioned includes a float chamber 10 having an inlet passage 11 operatively connected to a source of supply through a supply conduit A, and an outlet passage 12, a float 13 disposed within said chamber, a lower needle valve 14, which is controlled by the float 13 and an upper needle valve 15 adapted to cooperate with a seat 16 formed in the outlet passage. There is also disposed within the float chamber a deflector 16', which is positioned above and supported in spaced relation with respect to the float and float chamber and is carried by the outlet conduit in such a manner as to deflect the incoming fluids toward the walls of float chamber.

The valve means for atmospherically sealing the segregator, as shown in Figs. 1 and 2, comprises an air inlet conduit 17 having connection at its one end with the upper ends of the float chamber 10 and having a suction actuated valve unit 18 provided in its open end. This valve unit is constructed to readily respond to the reduced pressure effected within the float chamber when the pump is in operation, to atmospherically seal the segregator, thus producing an air-tight suction line and is also provided with means to assist in breaking the vacuum in the float chamber when the suction pump is inoperative or when the suction produced by the pump is cut off to permit the segregation of an accumulation of the fluids of heavier specific gravity. As best shown in Fig. 2, the valve unit comprises a valve member having a bowl shaped valve head 19 made of relatively light sheet metal and a valve stem 20 that is integral with the valve head. This valve is slidable within a relatively heavy plunger 21 and is provided with a stop such as a cotter pin 22 that passes through an opening in the valve stem and rests against the face of an adjusting nut 23 which serves as a stop for the plunger 21, which in turn is slidable within a bearing 24 made integral with the valve seat member 25. The plunger is also provided with a lower flange 26 which serves as a stop to limit its upward movement and is disposed in spaced relation to the valve head and bearing when the valve is in the open position. It will thus be seen that when the valve is in the open position, the suction pump will produce only a slight reduction of pressure in the float chamber, but inasmuch as the valve member is relatively light in weight, it will require only a small pressure drop in the float chamber to effect an upward movement thereof. As the valve member, however, moves upward to close the valve, it engages the plunger, the valve opening becoming more and more restricted and the pressure drop is consequently increased to cause the plunger to be carried upward by the suction actuated valve member. The valve and plunger will remain in the upward position as long as fluid is being sucked from the source of supply. When, however, the suction produced by the pump ceases either by reason of the pump being inoperative or because of the suction being cut off by the upper needle valve 15, the valve and plunger member will tend to be restored by gravity to their lower positions whence any fluid of heavier specific gravity accumulated in the float chamber will automatically be segregated.

It will, of course, be apparent to those skilled in the art, that according to the arrangement herein illustrated, as long as there is no accumulation of fluids of heavier specific gravity, the lighter fluids can be suction fed through the segregator and be thereafter dispensed without interruption. When, however, a predetermined quantity of the heavier fluids have accumulated in the float chamber, the upper needle valve 15, which is provided on the float will, when the float is displaced upwardly, be seated against its valve seat and the dispensing of the lighter fluids will be temporarily discontinued.

The float chamber 10 of the segregator is provided with a discharge passage 27 for the discharge therethrough of the liquid of heavier specific gravity and is controlled by the lower needle valve 14. In a system of the character wherein the desired lighter liquids are suction fed through the segregator, it is necessary that the float chamber be atmospherically sealed and to this end I provide a check valve 28 in the discharge passage 27 which is maintained closed as long as a suction pressure is present in the float chamber.

As shown in Figs. 1 and 3, a discharge tube 29 connects at its lower end to the check valve 28. This tube is provided with an upstanding portion 30 and an escape port 31. As will be noted the upstanding portion 30 is adapted to trap a desired head of the liquid of heavier specific gravity therein, which head of liquid serves the dual capacity of not only tending to maintain a definite pressure against the flapper of the check valve 28 to maintain the same closed but also serves the purpose of effecting an automatic segregation of the fluids of lighter and heavier specific gravity received in the float chamber of the segregator. The theory of operation of this automatic segregation is as follows. Assuming a slight leakage of liquid occurs at the lower needle valve 14 or assuming that through inadvertence the float 13 was damaged to such an extent as to cause its removal from the float chamber. As long as the float chamber 10 is sealed to atmosphere the pump when in operation will suction feed the liquids into the segregator float chamber.

The head of liquid received in the float chamber 10 added to the head of liquid received in the vertical portion of the discharge passage 27 is represented in Fig. 1 by the letter A. In accordance with the arrangement herein shown the liquid on entering the float chamber is deflected toward the side walls of the float chamber and separated into the fluid of lighter specific gravity designated by the letter B and fluid of heavier specific gravity designated by the letter C. Under ordinary conditions the line of separation between the lighter and heavier components would be approximately as indicated by the letter D, i. e., with the float in use and the needle valve 14 seated and no leakage occurring at this point. Under these conditions, should the lever D be raised the float 13 in responding to this level would be displaced upwardly, and the heavier component would automatically discharge through the passage 27. But assuming that leakage is occurring at the needle valve 14 or that the float has been entirely removed, it will be apparent that the fluid in entering the float chamber will pass through the discharge passage 27 and rise in the upstanding portion of the discharge tube 29 and trap therein a head of the heavier component designated by the letter G. As long as the combined pressure head E of the lighter component L and pressure head F of the heavier component C is greater than the pressure head G in the discharge tube 29 a spilling over of the heavier component will occur at the exhaust port 30 of the discharge tube and an automatic segregation of the heavier component from the lighter component in the float chamber will be effected. The greater the pressure head F of the heavier component in the float chamber, the longer will be the segregation that will take place. On the other hand, as the level D of the heavier component in the float chamber lowers, as would be the case were a desired grade of gasoline, for example, to be fed into the float chamber the pressure head of the lighter component would increase and at the same time the pressure head F would decrease until such a time that the combined pressure heads E and F would substantially be equal to the pressure head G, at which time automatic spilling over of the heavier component at exhaust port 30 would cease. Of course, it is to be understood that the pressure head of liquid that is trapped in the upstanding position of the discharge tube is determined by calculation so that in the event that the float chamber be entirely filled with the lighter component the pressure head of this liquid will be slightly less than the pressure head of the heavier component trapped in the discharge tube 29.

Having thus described my invention, what I claim as new and desire to secure by Letters Patent is:—

1. The combination with a container having a liquid supply conduit for receiving a mixture of liquids to be segregated and a discharge conduit for discharging the lighter of the liquids, of suction means in operative communication with said discharge conduit for withdrawing the lighter liquid, suction closed valve means associated with said liquid supply conduit for rendering said container air-tight during operation of said suction means and gravity opened to permit ingress of air into said container when said suction means is inoperative, and a discharge tube connected to the lower end of said container, said tube having an upstanding portion adapted for normally trapping a predetermined head of the liquid of heavier specific gravity therein when the heads of the liquids of different specific gravities in the container balance the head of the liquid trapped in the upstanding portion of said tube and for permitting a continuous flow of the heavy liquid from said tube as long as the heads of the liquids of different specific gravities are greater than the head of liquid in said upstanding portion.

2. In combination, a segregator having a mechanism adapted to segregate fluids of different specific gravities flowing therethrough from a source of supply, suction means in communication with said segregator for withdrawing the fluid of lighter specific gravity therefrom, valve means for preventing the ingress of air into said segregator when said suction means is in operation and to permit the ingress of air when said suction means is inoperative, and a discharge device in communication with said segregator for discharging the fluid of heavier specific gravity, said device comprising a tube including an upstanding portion adapted for trapping a predetermined head of the liquid of heavier specific gravity therein.

3. In combination, a segregator mechanism as set forth in claim 2, the tube of said discharge device being provided with an outwardly opening suction closed valve mechanism so constructed and arranged as to normally close under the action of suction and prevent the entrance of air into said segregator through said discharge tube when said suction means is in operation.

4. In a segregator mechanism of the type set forth in claim 2, the tube of said discharge device being characterized by including an outwardly opening check valve so constructed and arranged such that the pressure head of the liquid normally trapped in its upstanding portion tends to maintain said check valve closed against the admission of air therethrough.

DAVID SAMIRAN.